(12) United States Patent
Kawana et al.

(10) Patent No.: US 8,966,076 B2
(45) Date of Patent: Feb. 24, 2015

(54) MANAGEMENT APPARATUS, MANAGEMENT METHOD, AND COMPUTER-READABLE MEDIUM

(75) Inventors: Yoshimasa Kawana, Tokyo (JP); Akiko Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 13/476,257

(22) Filed: May 21, 2012

(65) Prior Publication Data
US 2012/0317286 A1 Dec. 13, 2012

(30) Foreign Application Priority Data

Jun. 9, 2011 (JP) ................................. 2011-129545
Dec. 13, 2011 (JP) ................................. 2011-272755

(51) Int. Cl.
| | | |
|---|---|---|
| G06F 15/173 | (2006.01) | |
| H04L 12/24 | (2006.01) | |
| G06F 21/60 | (2013.01) | |
| H04L 29/06 | (2006.01) | |

(52) U.S. Cl.
CPC ............. *H04L 41/28* (2013.01); *G06F 21/604* (2013.01); *G06F 21/608* (2013.01); *H04L 63/08* (2013.01); *H04L 63/20* (2013.01); *H04L 41/0213* (2013.01)
USPC ................ 709/225; 709/223; 709/229; 726/2

(58) Field of Classification Search
CPC ......... H04L 41/28; H04L 63/08; H04L 63/20; H04L 41/0213; G06F 21/604; G06F 21/608
USPC ................. 709/225, 223, 229; 726/2
See application file for complete search history.

(56) References Cited

U.S. PATENT DOCUMENTS

| | | | |
|---|---|---|---|
| 6,256,635 B1 | 7/2001 | Arrouye et al. | |
| 6,970,452 B2 * | 11/2005 | Kim et al. | ..................... 370/352 |
| 7,769,801 B2 * | 8/2010 | Shudo | ........................... 709/201 |

(Continued)

FOREIGN PATENT DOCUMENTS

| | | |
|---|---|---|
| CN | 101409654 A | 4/2009 |
| CN | 101425893 A | 5/2009 |
| CN | 101960446 A | 1/2011 |
| EP | 2241967 A2 | 10/2010 |
| JP | 2009-110261 A | 5/2009 |

OTHER PUBLICATIONS

European Search Report issued in corresponding application No. 12169420.2 on Feb. 21, 2013.
Li et al., "Network management architecture based on smart 802.1X client", Computer Applications, vol. 25, No. 9, Sep. 30, 2005, pp. 2114-2116, 2130.
Chinese Office Action issued in corresponding application No. 201210185297.4 on Dec. 17, 2014.

*Primary Examiner* — Kenneth Coulter
(74) *Attorney, Agent, or Firm* — Carter, DeLuca, Farrell & Schmidt, LLP

(57) ABSTRACT

A management apparatus that causes control unit to execute first management software for managing a plurality of devices on a network comprises: a first storing unit which stores authentication information to be used to access a device using a function of the first management software; a second storing unit configured to store authentication information to be used to access the device using a function of second management software that is added to the first management software to add a new function; a registration unit configured to register the device to be managed by the second management software; and a second setting unit configured to set the authentication information to be used to access the device using the function of the second management software.

19 Claims, 16 Drawing Sheets

(56) References Cited

U.S. PATENT DOCUMENTS

| | | | |
|---|---|---|---|
| 8,049,918 B2* | 11/2011 | Gorgenyi et al. | 358/1.15 |
| 8,316,076 B2* | 11/2012 | Shudo | 709/201 |
| 2002/0003789 A1* | 1/2002 | Kim et al. | 370/338 |
| 2005/0046890 A1* | 3/2005 | Shudo | 358/1.14 |
| 2005/0265304 A1* | 12/2005 | Kim et al. | 370/349 |
| 2010/0110476 A1 | 5/2010 | Gorgenyi et al. | |
| 2010/0115578 A1 | 5/2010 | Nice et al. | |
| 2010/0281098 A1* | 11/2010 | Shudo | 709/201 |
| 2013/0074157 A1* | 3/2013 | Shudo | 726/3 |

\* cited by examiner

FIG. 6

| Device ID | Community Name | Type |
|---|---|---|
| Device A | public-parent | COMMON COMMUNITY NAME |
| Device B | dev-group1 | SPECIFIC COMMUNITY NAME |
| Device C | dev-group1 | SPECIFIC COMMUNITY NAME |
| Device D |  | WITHOUT COMMUNITY NAME |
| ... | ... | ... |
| Device X | dev-groupZ | SPECIFIC COMMUNITY NAME |
| Default Device | public-parent | COMMON COMMUNITY NAME |

| Device ID | Community Name | Type |
|---|---|---|
| Device A | public-parent | ACQUIRE COMMUNITY NAME OF MANAGEMENT SOFTWARE |
| Device C | maintenance-group1 | ADD COMMUNITY NAME SPECIFIC TO PLUG-IN |
| Device D | public-plugin | ACQUIRE COMMUNITY NAME COMMON TO PLUG-IN |
| ... | ... | ... |
| Device X | dev-groupZ | ACQUIRE COMMUNITY NAME OF MANAGEMENT SOFTWARE |
| Default Device | public-plugin | COMMUNITY NAME COMMON TO PLUG-IN |

FIG. 8

| Device ID | Community Name | Comment |
|---|---|---|
| Device A | public-parent | ACQUIRE COMMUNITY NAME OF MANAGEMENT SOFTWARE |
| Device C | dev-group1 | ACQUIRE COMMUNITY NAME OF MANAGEMENT SOFTWARE |
| Device D | public-plugin | ACQUIRE COMMUNITY NAME COMMON TO PLUG-IN |
| ... | ... | ... |
| Device X | dev-groupZ | SPECIFIC COMMUNITY NAME |
| Default Device | public-parent | COMMON COMMUNITY NAME |

801　802　803

F I G. 12A

Add Device to Be Monitored

| Select All | Clear All | × Delete | Retrieve the Device ID | Add from Device List | Add Blank Row |

1201

1-1 / 1  20 Rows ▼ / 1 Page

| No. | IP Address/Host Name | Device Name | Product Name | Device ID | Community Name | Type |
|---|---|---|---|---|---|---|
| ☐ 1 | | | | | | |

1-1 / 1

[◄]

[Add] [Cancel]

[◄]  [?]

F I G. 12B

All Devices

| Select All | Clear All |
|---|---|

[ ↳ Add to Target Devices ]

1-5 / 1121  [5 Rows ▾] / 1 Page [1 2 3 4 5 ▸] [▸|]

| | Device Name ▲ | Product Name | IPv4 Address | Serial Number | MAC Address | Update On |
|---|---|---|---|---|---|---|
| ☑ | iPR C1PLUS | Canon iPR C1PLUS | 192.168.0.1 | | 00:00:85:C4:95:9D | 2011/02/10 14:54:24 |
| ☑ | iPR C1PLUS | Canon iPR C1PLUS | 192.168.0.2 | | 00:00:85:18:9C:97 | 2011/02/10 14:54:24 |
| ☐ | iPR C1PLUS | Canon iPR C1PLUS | 192.168.0.6 | | 00:00:85:18:9C:99 | 2011/02/10 14:54:24 |
| ☐ | iPR C1PLUS | Canon iPR C1PLUS | 192.168.0.8 | | 00:00:85:18:9C:9A | 2011/02/10 14:53:52 |
| ☐ | iPR C1PLUS | Canon iPR C1PLUS | 192.168.0.9 | | 00:00:85:18:9C:9B | 2011/02/10 14:53:52 |

[|◂] 1-5 / 1121 [1 2 3 4 5 ▸] [▸|]

[|◂]  [ Add ] [ Cancel ]  [?]

~1202

F I G. 12C

Add Device to Be Monitored

| Select All | Clear All | × Delete | Retrieve the Device ID | Add from Device List | Add Blank Row |

1-2 / 2  [ 20 Rows ▼ ] / 1 Page

| | No. | IP Address/Host Name | Device Name | Product Name | Device ID | Community Name | Type |
|---|---|---|---|---|---|---|---|
| ☐ | 1 | 192.168.0.1 | iPR C1PLUS | Oanon iPR C1PLUS | | ●●● | Oanon Device |
| ☐ | 2 | 192.168.0.2 | iPR C1PLUS | Oanon iPR C1PLUS | | ●●● | Oanon Device |

1-2 / 2

[ Add ] [ Cancel ]  [ ? ]

Device Information

| Device Name | iR-ADV C5051 |
|---|---|
| Product Name | Oanon iR-ADV C5051 |
| MAC Address | 00:1E:8F:2E:CB:21 |
| Location | |
| IPv4 Address | 172.24.93.173 |
| IPv6 Address | |
| Host Name | |
| Serial Number | DZJ01302 |
| SNMP Community Name | (set) |

Device Information

| Device Name | iR-ADV C5051 |
|---|---|
| Product Name | Oanon iR-ADV C5051 |
| MAC Address | 00:1E:8F:2E:CB:21 |
| Location | |
| IPv4 Address | 172.24.93.173 |
| IPv6 Address | |
| Host Name | |
| Serial Number | DZJ01302 |
| SNMP Community Name | maintenance-group1 |

~1302

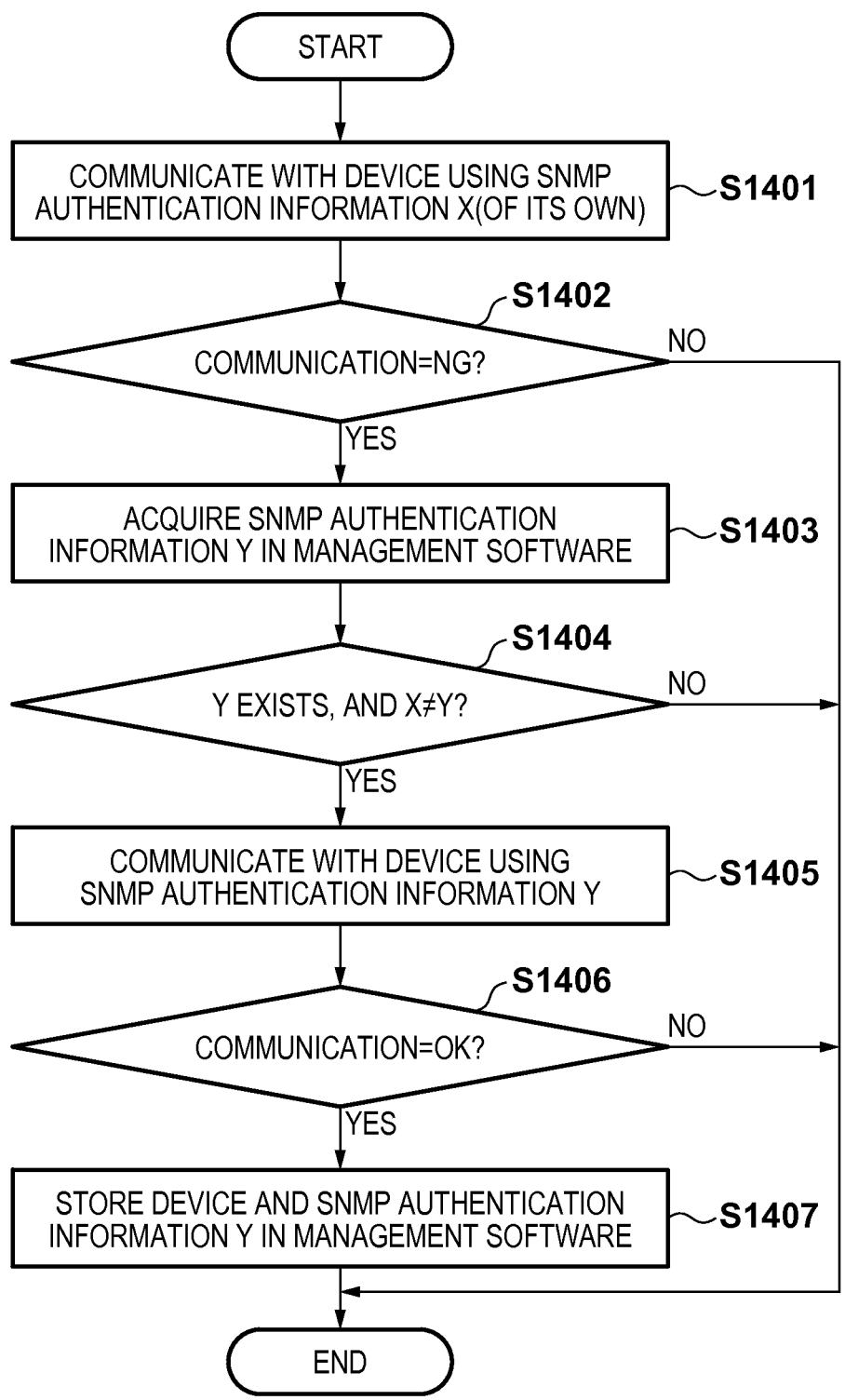

MANAGEMENT APPARATUS, MANAGEMENT METHOD, AND COMPUTER-READABLE MEDIUM

BACKGROUND OF THE INVENTION

1. Field of the Invention

The present invention relates to management apparatus, management method and computer-readable medium. The present invention relates to a technique of managing a device on a network and, more particularly, to a technique of managing authentication information when managing a device using SNMP.

2. Description of the Related Art

Management software for managing an image forming apparatus (to be referred to as a device hereinafter) such as a printer conventionally uses SNMP (Simple Network Management Protocol) as the communication protocol. The management software acquires information necessary for device management using the SNMP. At this time, the management software manages SNMP authentication information (including a community name in SNMP version 1) to be used to acquire information from a device. A related art for managing the authentication information is disclosed in which appropriate authentication information is determined from a plurality of candidates in accordance with the type of the management target device (for example, Japanese Patent Laid-Open No. 2009-110261).

On the other hand, as the management software, there exist software to be used by the system administrator to confirm the operation state of a device and software to be used by an external serviceman undertaking maintenance to do management for device repair or part delivery from a remote site. To cope with the different purposes, plug-in software exists which is used to add a function for a different purpose to a piece of management software or extend its function. The device on the network is assumed to be managed in accordance with each purpose using the plug-in software.

However, the related art does not assume a method of managing authentication information for each of the pieces of software of different management purposes. In, for example, Japanese Patent Laid-Open No. 2009-110261, each of management software and plug-in software manages authentication information of a device. This related art does not assume a method of allowing the plug-in software to use the authentication information managed in the management software at all.

SUMMARY OF THE INVENTION

The present invention allows even management software extended by plug-in software for a different management purpose to manage authentication information used to manage a device on a network in accordance with each management purpose.

According to one aspect of the present invention, there is provided a management apparatus that causes control unit to execute first management software for managing a plurality of devices on a network, comprising: a first storing unit configured to store authentication information to be used to access a device using a function of the first management software; a second storing unit configured to store authentication information to be used to access the device using a function of second management software that is added to the first management software to add a new function; a registration unit configured to register the device to be managed by the second management software; and a second setting unit configured to set the authentication information to be used to access the device using the function of the second management software, wherein when the second setting unit sets the authentication information, the second storing unit stores the set authentication information as the information to be used to access the registered device, and when the second setting unit does not set the authentication information, and the first storing unit stores the authentication information to be used to access the registered device, the second storing unit stores the authentication information stored in the first storing unit as the information to be used to access the registered device.

According to another aspect of the present invention, there is provided a management method of a management apparatus that causes control unit to execute first management software for managing a plurality of devices on a network, the management apparatus including a first storing unit configured to store authentication information to be used to access a device using a function of the first management software, and a second storing unit configured to store authentication information to be used to access the device using a function of second management software that is added to the first management software to add a new function, comprising: a registration step of registering the device to be managed by the second management software; and a second setting step of setting the authentication information to be used to access the device using the function of the second management software, wherein when the authentication information is set in the second setting step, the second storing unit stores the set authentication information as the information to be used to access the registered device, and when the authentication information is not set in the second setting step, and the first storing unit stores the authentication information to be used to access the registered device, the second storing unit stores the authentication information stored in the first storing unit as the information to be used to access the registered device.

According to another aspect of the present invention, there is provided a computer-readable medium storing a program to be executed by a computer to add a new function to management software for managing a plurality of devices on a network, the computer including a first storing unit configured to store authentication information to be used to access a device using a function of the management software, and a second storing unit configured to store authentication information to be used to access the device using the function of the program added to the management software, wherein the program causes the computer to execute: a registration step of registering the device to be managed by the program; and a setting step of setting the authentication information to be used to access the device using the function of the program, when the authentication information is set in the setting step, the second storing unit stores the set authentication information as the information to be used to access the registered device, and when the authentication information is not set in the setting step, and the first storing unit stores the authentication information to be used to access the registered device, the second storing unit stores the authentication information stored in the first storing unit as the information to be used to access the registered device.

According to the present invention, it is possible to allow even management software extended by plug-in software for a different management purpose to manage authentication information used to manage a device on a network in accordance with each management purpose.

Further features of the present invention will become apparent from the following description of exemplary embodiments (with reference to the attached drawings).

BRIEF DESCRIPTION OF THE DRAWINGS

FIG. 6 is a table showing authentication information data managed in management software;

FIG. 7 is a table showing authentication information data managed in plug-in software;

FIG. 8 is a table showing authentication information data managed in plug-in software after an update instruction is received;

FIGS. 12A, 12B, and 12C are views showing examples of a device registration screen in the plug-in software;

FIGS. 13A and 13B are views showing examples of detailed device information display in the plug-in software; and FIG. 14 is a flowchart showing device community name update processing.

DESCRIPTION OF THE EMBODIMENTS

An embodiment of the present invention will now be described with reference to the accompanying drawings.

Example of Arrangement of Device Management System

Figure 1:
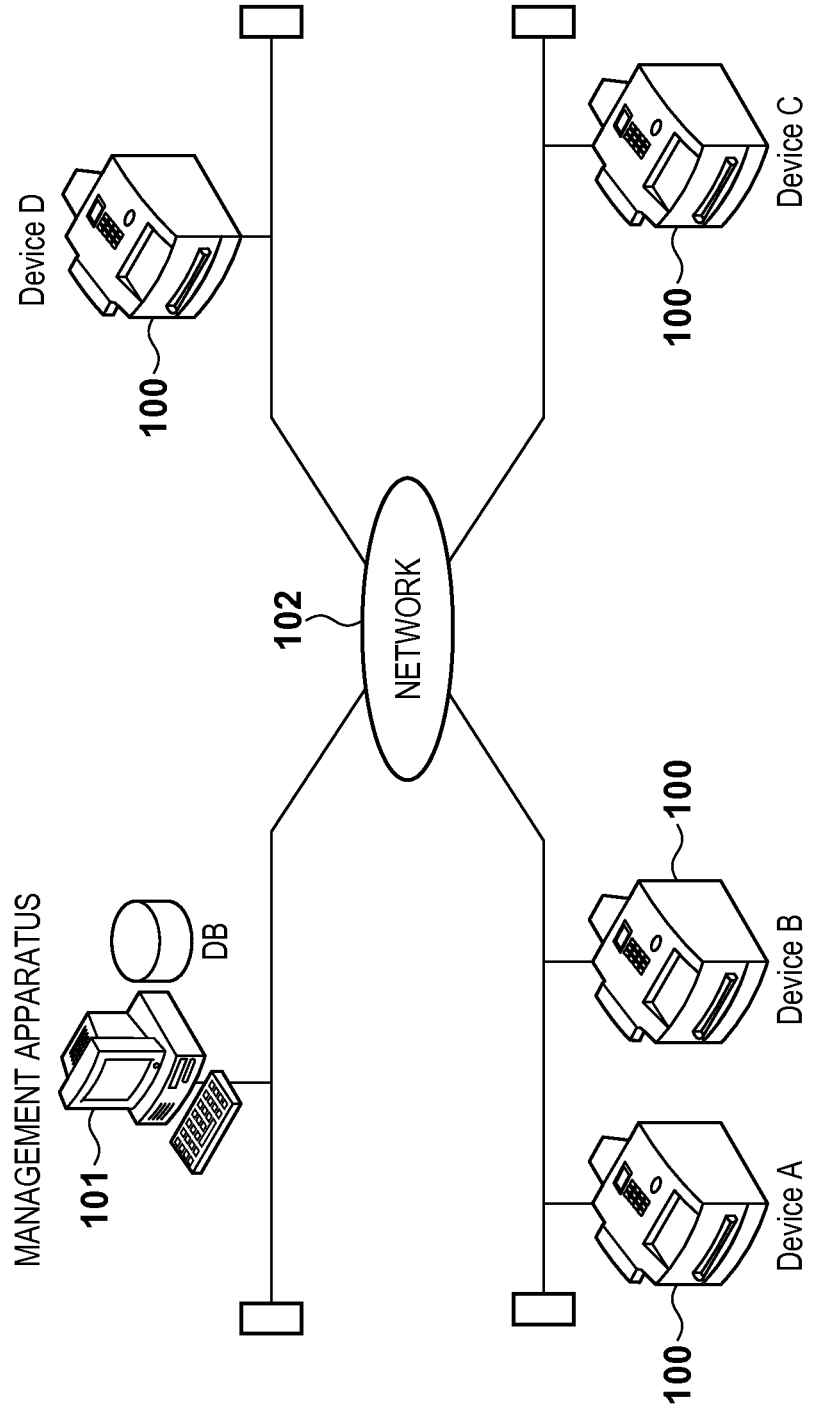
FIG. 1 is a view snowing an example of the network connection relationship between devices and a management apparatus 101.

FIG. 1 is a view showing the connection relationship between copying machines and a management apparatus 101 according to the embodiment of the present invention. Referring to FIG. 1, a device 100 represents an MFP (Multi Function Printer) or an SFP (Single Function Printer) connected to the intranet of a customer. These devices having a print/copy function will be generically referred to as "devices" herein. In this embodiment, four devices are illustrated in FIG. 1 as an example. However, the number of devices is not limited to this, and more devices may be connected. In this specification, the devices will be referred to as devices A to D only when they need to be explained individually in association with processing. For a general description, the devices will be referred to as devices 100.

The management apparatus 101 manages the plurality of devices 100 shown in FIG. 1. Management software to be used to manage the devices 100 is installed in the management apparatus 101. The management apparatus 101 manages the devices by communicating with the devices and thus acquiring information from them or changing set values. The management apparatus 101 includes a database (DB) to manage various kinds of information. A network 102 indicates a network to which the devices 100 and the management apparatus 101 are connected. In this embodiment, the network 102 will be explained as a LAN (Local Area Network) for an enterprise or a campus. However, the arrangement is not limited to this, and connection on a network such as the Internet may be employed.

Each device 100 has a self-management function using SNMP (Simple Network Management Protocol). The SNMP returns a response to a query about various kinds of information concerning the system such as the network communication state of the device 100, the system name, and the time after activation. The device 100 receives a query and authentication information (for example, community name in SNMP version 1) using the protocol. Upon receiving authentication information together with a query, the device 100 verifies the authentication information and, upon determining that the authentication information is correct, responds to the query. Note that the community represents the network range managed by the SNMP. The management apparatus 101 manages devices belonging to the range. In this case, the community name serves as authentication information (password) to make a device belong to the community.

Although the management apparatus 101 is illustrated as a general PC (Personal Computer) in the drawing, it represents a device capable of executing management software. Hence, the management software can be installed not only in a PC but also in dedicated hardware or the device 100. The form of the management apparatus 101 is not particularly limited here.

The management software installed in the management apparatus 101 has a device management function using SNMP and can acquire management information from each device connected to the network. The system administrator who manages the devices sets SNMP authentication information when registering a device in the management software. To acquire management information from the device 100, the management software issues a query to the device 100 using the SNMP authentication information.

Adding plug-in software (plug-in program) allows to add a function to the management software or extend the management software. An example of the plug-in software is plug-in software for a serviceman who undertakes the maintenance service of the device 100. More specifically, the plug-in software collects operation information such as failure information and counter information including the number of printed pages and the number of times of part use from the device and transmits the information to a remote server for maintenance on an external network such as the Internet. The plug-in software also implements a function of accessing a remote server to change the operation information to be collected from the device or acquire a command to recover a device failure. Such a remote maintenance service may target a device different from those of other management functions, as a matter of course.

When registering a management target device, the plug-in software can set the authentication information of the device. Since the user (for example, the system administrator) of the management software and the user (for example, the serviceman of the maintenance service) are different, different pieces of authentication information can be set for a single device in correspondence with the respective pieces of software. The plug-in software can also refer to the authentication information set in the management software serving as parent software and set it as device management information.

In a user environment under tight security control, service authentication information to be used for a device maintenance service is set in each device, and information is acquired from each device using authentication information unique to plug-in software. On the other hand, in a user environment under lax security control, plug-in software need not set authentication information. Instead, the plug-in software can refer to the authentication information in management software and set it. The user environment under lax security control indicates, for example, an environment in which uniform authentication information is set for a plurality of monitoring target devices.

Example of Arrangement of Control Unit of Device

Figure 2:
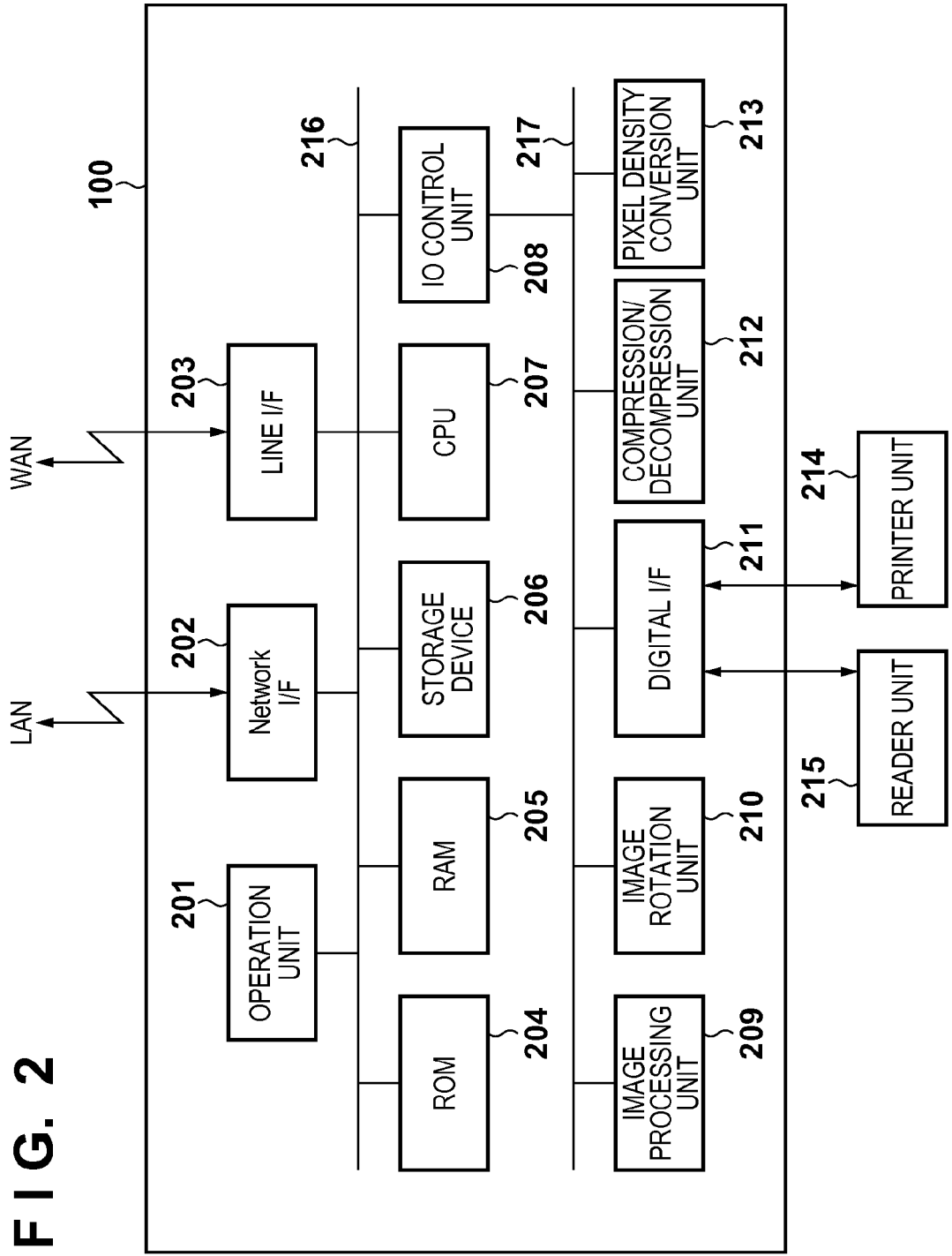
FIG. 2 is a block diagram showing an example of the hardware arrangement of a device.

FIG. 2 is a block diagram showing an example of the hardware arrangement concerning the control unit of the device 100 shown in FIG. 1. The control unit of the device 100 mainly controls a program configured to implement an image processing function such as a printing or scanning function of the device 100. The control unit also controls a program such as an SNMP service program configured to implement a processing function of the management system. Upon receiving a query about management information from the management apparatus 101 by SNMP, the device 100 generates the data of management information of the device 100 in the control unit based on the SNMP communication format and returns the information to the management apparatus 101.

The control unit of the device according to this embodiment includes a part for performing system management and a part for performing image processing. The constituent elements of the control unit for system management include an operation unit 201, a network I/F 202, a line I/F 203, a ROM (Read Only Memory) 204, a RAM (Random Access Memory) 205, a storage device 206, and a CPU (Central Processing Unit) 207. The constituent elements for image processing include an IO control unit 208, an image processing unit 209, an image rotation unit 210, a digital I/F 211, a compression/decompression unit 212, and a pixel density conversion unit 213. These constituent elements are connected to a system bus 216 and an image bus 217.

The constituent elements to be described below are arranged on the system bus 216. The operation unit 201 incorporates a display unit and. a key input unit, which are controlled by the CPU 207. The operator inputs various kinds of settings and instructions concerning scanner reading and print output and operation and stop instructions via the key input unit. The operator can also change and set SNMP authentication information via the operation unit 201.

The network I/F 202 is an interface unit to connect the device 100 to the LAN. The network I/F 202 communicates with the management apparatus 101 via the LAN. For example, the device 100 receives a query about device management information from the management apparatus 101 by SNMP and returns a corresponding response via the network I/F 202.

The line I/F 203 is connected to ISDN (Integrated Services Digital Network) or a public telephone network and transmits/receives data to/from a remote terminal. The line I/F 203 is controlled by a communication control program to transmit/receive facsimile data and the like.

The ROM 204 stores various kinds of control programs of the device 100 and the SNMP service program. These various kinds of programs are executed by the CPU 207. The RAM 205 serves as a work memory area to execute various kinds of programs. The RAM 205 temporarily stores, for example, status information necessary for the SNMP service program to manage device information or image data received from network I/F 202.

The storage device 206 serving as a storage unit is a non-volatile memory device which stores various kids of operation mode settings, counter values (for example, the number of printed pages for each size and the number of times of document reading), status information (including a status flag), and the like which need, to be stored even after reactivation of the device 100. The setting information stored in the storage device 206 includes the SNMP authentication information set by the operation unit 201. The operating system (OS) of the device and other application programs are also stored in the storage device 206.

The CPU 207 reads out the control programs and SNMP service program stored in the ROM 204 or the storage device 206 to the RAM 205 and executes them. The CPU 207 executes the control programs so as to read out failure information and operation information such as the counter values and the operation log from the storage device 205 and transmit them to the management apparatus 101 via the network I/F 202 as the status information of the device 100.

The SNMP service program executed by the CPU 207 receives a query about device management information from the network I/F 202 together with authentication information. Upon determining based on SNMP authentication information read out from the storage device 206 that the received authentication information is correct, the SNMP service program returns a response corresponding to the query about device management information.

The IO control unit 206 is a bus bridge that connects the system bus 216 and the image bus 217 for transferring image data at a high speed. The image bus 217 is formed from a bus such as 1EEE1394.

The constituent elements to be described below are arranged on the image bus 217. The digital I/F 211 connects a reader unit 215 and a printer unit 214 of the device 100 to the control unit so as to perform conversion between a synchronous system and an asynchronous system of image data. Information detected by the above-described various kinds of sensors arranged in various places of the reader unit 215 or the printer unit 214 is supplied to the system bus 216 via the digital I/F 211 and the IO control unit 208.

The image processing unit 209 corrects, manipulates, and edits input and output image data. The image rotation unit 210 rotates image data. The image compression/decompression unit 212 performs compression/decompression processing such as JPEG for multilevel image data and JBIG/MMR/MR/ME for binary image data. The pixel density conversion unit 213 converts the resolution of output, image data. Note that the method of decompression processing is merely an example and is not limited to this.

Software Module Configuration of Device

Figure 3:
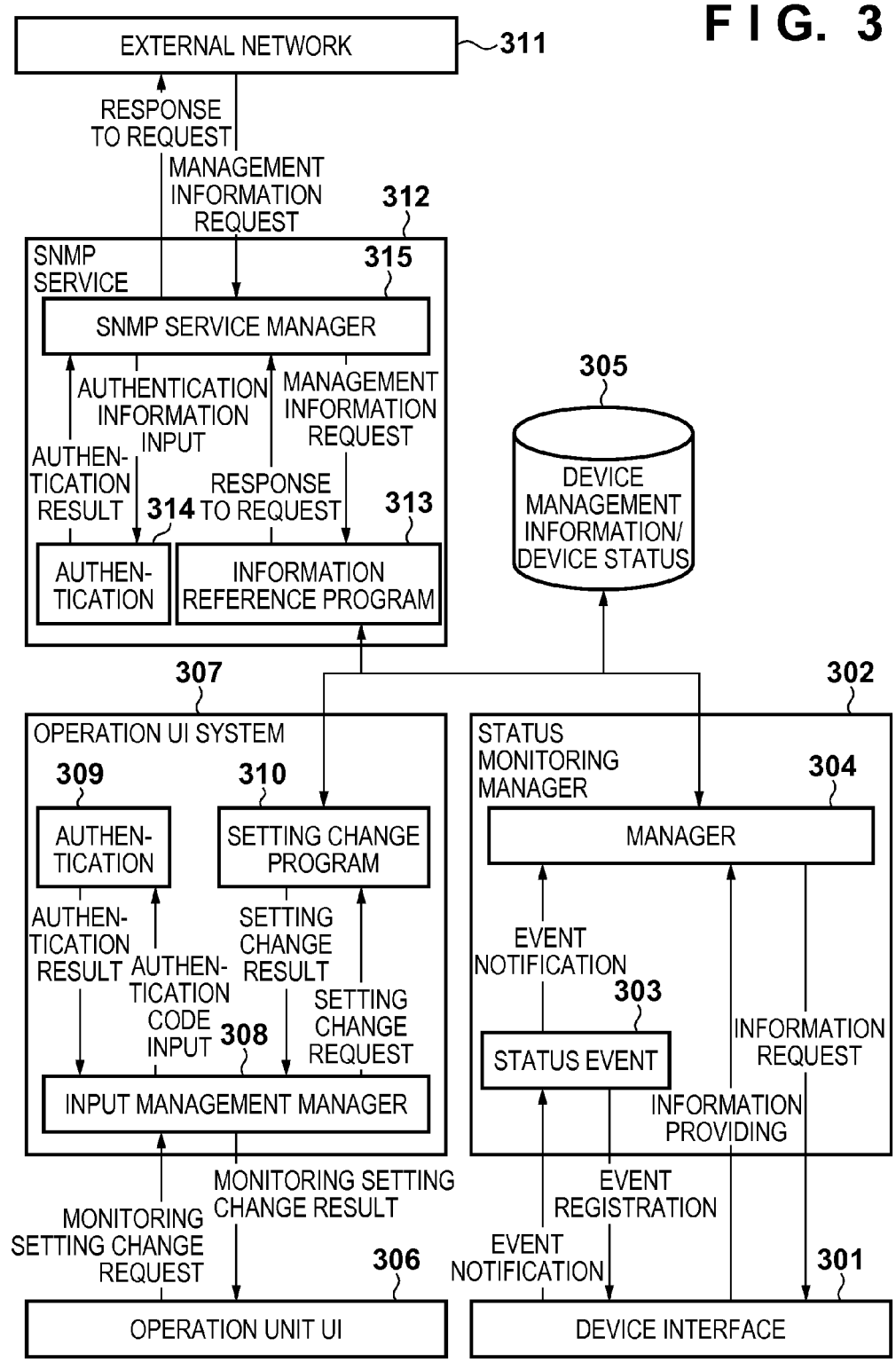
FIG. 3 is a block diagram showing an example of the software functional arrangement of a device.

FIG. 3 is a block diagram showing an example of the software module configuration of a device capable of communicating with an external system out of the devices 100 shown in FIG. 1. The functions in SNMP setting processing to the management apparatus 101 related to the present invention will mainly be explained.

Constituent elements 301 to 310 and 312 to 315 shown in FIG. 3 correspond to the software modules of the device 100. As the software modules of the device 100, the status monitoring manager 302, the operation UI system 307, and the SNMP service 312 are illustrated. The device interface 301 represents the IO control unit 208 shown in FIG. 2. An image forming apparatus status including errors (also called failures) detected in the printer unit 214 is sent to the status monitoring manager 302 via the interface. The errors in the image forming apparatus include service call errors such as a hard disk error and a charge counter error and errors such as paper jam and toner low warning. Door open and overload of sheets on the discharge tray are also included.

The status event module 303 notifies the manager 304 of error information sent from the device interface 301. The error information sent from the device interface 301 is based on an image forming apparatus status detected by various kinds of sensors in the printer unit 214 shown in FIG. 2. The error information time-serially changes.

The nonvolatile storage device 305 corresponds to the ROM 204 and the storage device 206 in FIG. 2. The nonvolatile storage device 305 stores device management information such as firmware information and a device identification number necessary for device management. The nonvolatile storage device 305 stores not only the device management information but also log information, counter information, and failure information output from the programs. SNMP authentication information related to the present invention is also stored here as risk management information.

The operation unit UI 306 represents the operation unit 201 shown in FIG. 2. The operator can on/off-control various kinds of protocols of the device 100 and do other device settings via the operation unit UI 306. The device 100 has an authentication function so as to allow only an operator having appropriate authority to change the settings of the device 100. The operator can change the device settings by inputting authentication information via the operation unit UI 306.

The input management manager 308 receives operator input information from the operation unit UI 306 and issues a request to an appropriate program. When requested to output a setting information change screen for the device via the operation unit UI 306, the input management manager 308 requests authentication information via the operation unit UI 306 to confirm whether the operator is a user having appropriate authority. Upon receiving authentication information from the operator, the input management manager 308 sends an authentication request to the authentication program 309 together with the received authentication information. Upon receiving an authentication success result from the authentication program 309, the input management manager 303 permits the operator to access the setting change program 310. More specifically, the input management manager 308 returns a setting menu provided by the setting change program 310 to the operation unit UI 306 and receives a request from the operator. In addition, upon receiving a setting change request for the device from the operator having appropriate authority, the input management manager 308 issues a setting change request to the setting change program 310.

The authentication program 309 verifies whether the operator has appropriate authority. The authentication program 309 determines whether the operator has appropriate authority, and returns the authentication result to the input management manager 308.

The setting change program 310 receives a device setting change and notifies each program of it or stores it in the nonvolatile storage device 305. Upon receiving a setting change request issued by the input management manager 308, the setting change program 310 writes new setting information in the nonvolatile storage device 305 and returns the processing result to the input management manager 308.

For example, to change SNMP authentication information, the operator first successfully does authentication via the operation unit UI 306 to obtain an access right to the setting change program 310. Next, the operator selects an SNMP authentication information change instruction from the setting menu provided by the setting change program 310. When the operator designates SNMP authentication information change on the UI provided by the setting change program 310, the input management manager 308 receives the setting change request via the operation unit UI 306. The input management manager 308 issues an SNMP authentication information change request to the setting change program 310. The setting change program 310 writes new authentication information in the nonvolatile storage device 305 in which the SNMP authentication information is actually stored. When the change request has correctly been processed, the operator is notified of completion of the change via the programs.

The SNMP service 312 indicates an SNMP service that runs on the device 100. The SNMP service 312 sets and returns various kinds of management information of the device, including the status and set values of the device and the status of the network I/F. The device 100 causes the SNMP service 312 to receive an SNMP query issued by the management apparatus 101. The SNMP query contains authentication information and an OID (Object ID) that is an identifier representing the type of management information. The SNMP service 312 analyzes the received query, divides it into authentication information and a request, and determines whether the authentication information is correct. When authentication has succeeded, the SNMP service 312 acquires a response to the request from another storage location, and returns it to the management apparatus 101 as the response to the SNMP request.

The SNMP service manager 315 is a program that receives a management information request from the external network 311. The SNMP service manager 315 analyzes a received SNMP request and separates the OID portion and authentication information contained in the SNMP request. The SNMP service manager 315 then sends an authentication request to the authentication program 314 using the authentication information acquired by analysis, and receives an authentication result as a response. If the authentication result represents that the authentication has succeeded, the SNMP service manager 315 requests the necessary management information from the information reference program 313 based on the SNMP request received together with the authentication information. When the information reference program 313 returns the management information corresponding to the request, the SNMP service manager 315 converts the management information into the SNMP response format and. returns the SNMP response to the management apparatus 101.

The authentication program 314 verifies whether an SNMP request is issued by a correct issuer. The authentication program 314 determines whether an SNMP request is issued by a correct issuer, and returns the authentication result to the SNMP service manager 315.

The information reference program 313 receives device management information or setting information query from the SNMP service manager 315. At this time, the information reference program 313 acquires the setting information from the nonvolatile storage device 305 or another program in response to the received query, and returns it to the SNMP service manager 315 as the response.

Example of Arrangement of Control Unit of Management Apparatus 101

Figure 4:
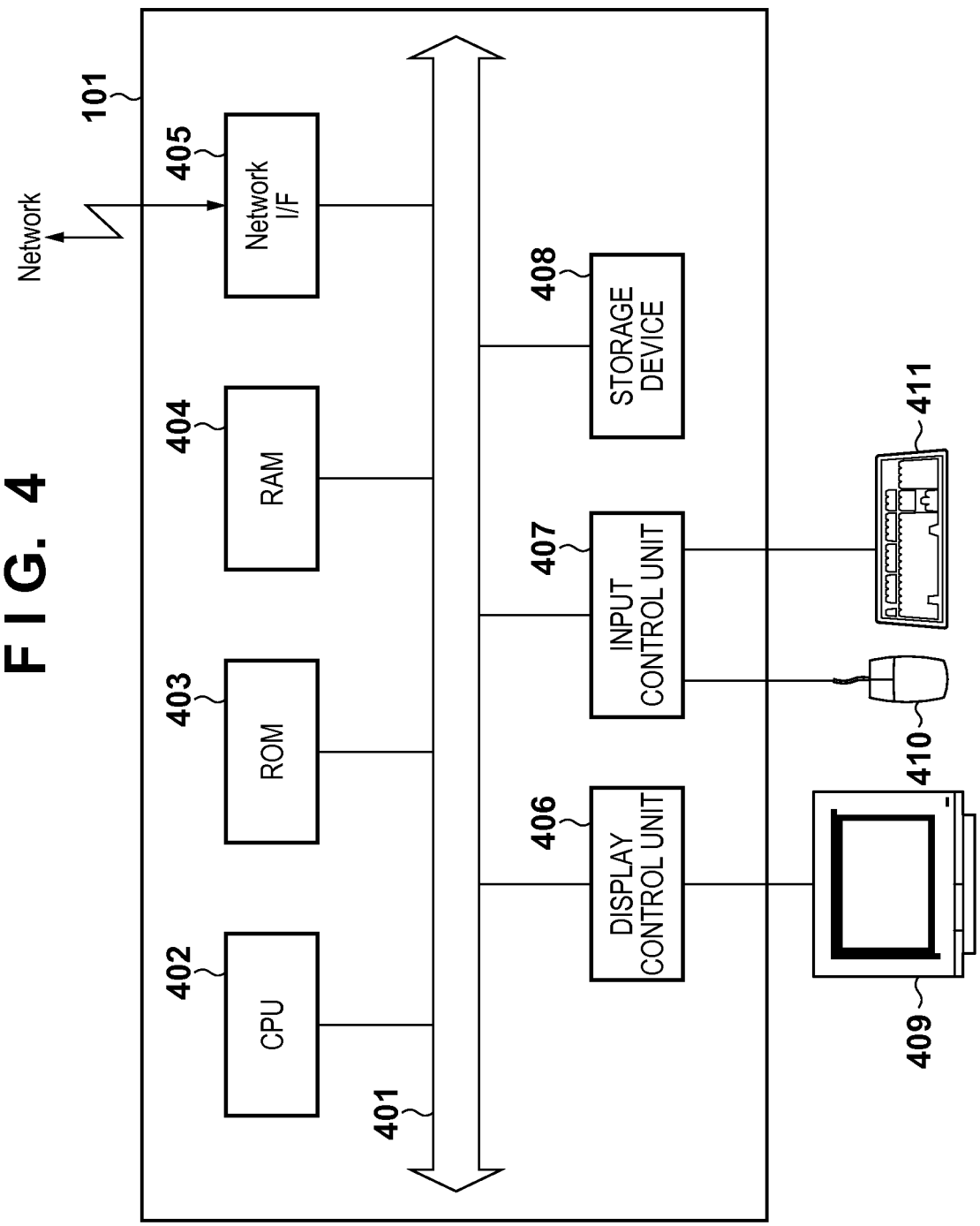
FIG. 4 is a block diagram showing an example of the hardware arrangement of the management apparatus 101.

FIG. 4 is a block diagram showing an example of the hardware arrangement of the management apparatus 101 shown in FIG. 1. The management apparatus 101 executes an application for collecting device management information acquired from the device 100 using SNMP. The management apparatus 101 has the arrangement of a general information processing apparatus. That is, the management apparatus 101 includes a network I/F 405, a display control unit 406, a display device 409, an input control unit 407, input devices 410 and 411, and a storage device 408 in addition to a bus 401, a CPU 402, a ROM 403, and a RAM 404.

The bus 401 serves as a common signal path to transfer data between the components of the management apparatus 101 shown in FIG. 1. The RAM 404 is a rewritable storage unit and serves as a work memory area to execute the management software of the device. The management software of the device includes, for example, a program for acquiring management data from the device 100 using SNMP. Management data acquired from the device 100 is expanded on the RAM and converted into a predetermined format.

The storage device 408 is a nonvolatile storage device. The storage device 408 stores the OS that controls hardware. In addition, a list of the devices 100 to be managed and programs constituting the management software and plug-in software are stored. In addition to the programs, setting information to be used to process a program such as authentication information when issuing an SNMP request is also stored in the storage device 408.

The network I/F 405 is an interface that connects the apparatus to the LAN and communicates with the device 100 via the LAN. The CPU 402 separately or systematically controls the components 403 to 411 and collects the management information of the device 100 via the network I/F 405 nursed on the programs and schedule stored in the storage device 408.

Example of Software Configuration of Management Apparatus 101

Figure 5:
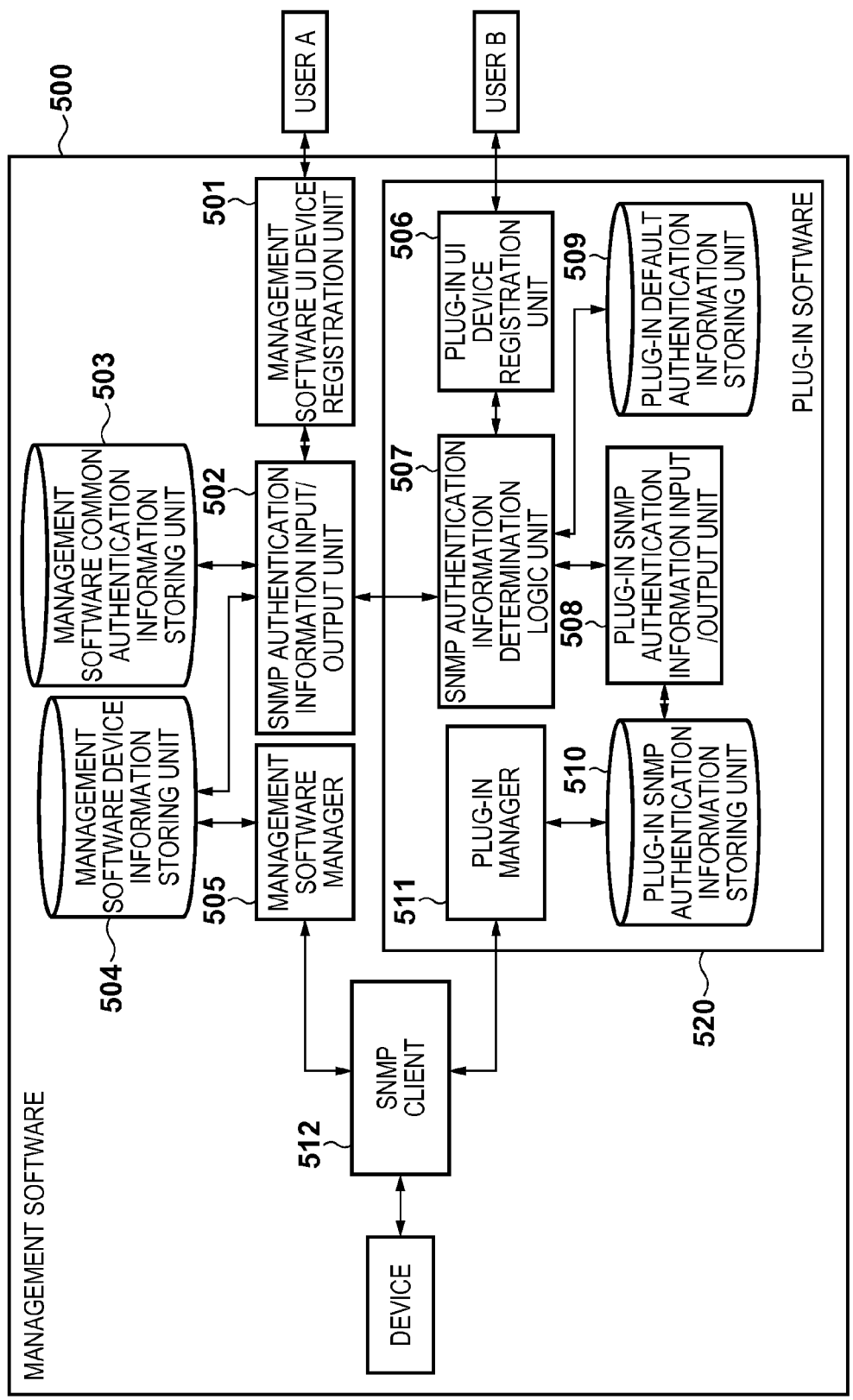
FIG. 5 is a block diagram showing an example of the software functional arrangement of the management apparatus 101.

FIG. 5 is a block diagram showing the functions of an application program that stores SNMP authentication information in management software (first management software) and plug-in software (second management software) installed in the management apparatus 101. The user who uses the management software is defined as "user A", the user who uses the plug-in software is defined as "user B". A description will be made assuming different input processes of the pieces of software. The user of each software corresponds to a user with the above-described purpose such as system management or maintenance service. Management software 500 and plug-in software 520 can cooperate by causing an SNMP authentication information input/output unit 502 and an SNMP authentication information determination logic unit 507 to transmit/receive various kinds of information. Transmission/reception of various kinds of information is also done between an SNMP client 512 and a plug-in manager 511.

Each application program has a UI for receiving management, device registration from each user. The device registration screen in the management software 500 is a management software UI device registration unit 501, and the device registration screen in the plug-in software 520 is a plug-in UI device registration unit 506.

The user A can set and change the default value of SNMP authentication information via the management software UI device registration unit 501. The SNMP authentication information is assigned as the default value if no SNMP authentication information is set at the time of individual device registration. The user A may intentionally omit setting of the SNMP authentication information as the default value (no setting). Upon receiving an SNMP authentication information default value registration request from the user A, the management software UI device registration unit 501 issues a registration request to the SNMP authentication information input/output unit 502. Upon receiving the SNMP authentication information default value registration request, the SNMP authentication information input/output unit 502 registers the SNMP authentication information as the default value in a management software common authentication information storing unit 503. The SNMP authentication information input/output unit 502 implements a first setting unit. The management software common authentication information storing unit 503 is formed from, for example, the storage device 408. The SNMP authentication information input/output unit 502 also implements a third setting unit using the management software common authentication information storing unit 503.

The user A can also register a device to be managed together with SNMP authentication information via the management software UI device registration unit 501. At this time, the IP address of the device, identification information (for example, MAC address) to uniquely identify the device, and the like are also registered. Note that, this processing is not directly relevant to the features of the present invention, and a description thereof will be omitted. The SNMP authentication information to be input here is not an indispensable item and need not always be registered. Upon receiving a management device registration request, the management software UI device registration unit 501 transfers the device information and the SNMP authentication information to the SNMP authentication information input/output unit 502.

The SNMP authentication information input/output unit 502 receives the device registration request from the management software UI device registration unit 501. When SNMP authentication information is registered together with the device information by the registration request, the SNMP authentication information input/output unit 502 registers the device 100 and the SNMP authentication information in a management software device information storing unit 504 in association with each other.

If no SNMP authentication information is registered together with the device information, the SNMP authentication information input/output unit 502 acquires the default value of the SNMP authentication information to be commonly used in the entire management software from the management software common authentication information storing unit 503. The SNMP authentication information input/output unit 502 registers the device and the default value of the SNMP authentication information in the management software device information storing unit 504 in association with each other. If no SNMP authentication information default value is set in the management software common authentication information storing unit 503, the device 100 is registered in the management software device information storing unit 504 without the SNMP authentication information. The management software device information storing unit 504 is formed from, for example, the storage device 408.

A management software manager 505 acquires device management information from the device 100 via the network based on a unique schedule or a user instruction. The management software manager 505 extracts the target device and its SNMP authentication information from the management software device information storing unit 504 and issues a device management information acquisition request to the SNMP client 512. If no SNMP authentication information corresponding to the device 100 is registered, the management software manager 505 does not acquire device management information from the device 100 using SNMP.

Management of SNMP authentication information in the plug-in software 520 will be described next.

The user B can register a device to be managed together with SNMP authentication information via the plug-in UI device registration unit 506. At this time, the IP address of the device, identification information (for example, MAC address) to uniquely identify the device, and the like are also registered. This processing is not directly relevant to the features of the present invention, and a description thereof will be omitted. The SNMP authentication information to be input here is not an indispensable item and need not always be registered. Upon receiving a management device registration request, the plug-in software UI device registration unit 506 transfers the device information and the SNMP authentication information to the SNMP authentication information determination logic unit 507.

The SNMP authentication information determination logic unit 507 receives the device registration request from the plug-in UI device registration unit 506. When SNMP authentication information is registered together with the device information by the registration request, the SNMP authentication information determination logic unit 507 issues a registration request to a plug-in SNMP authentication information input/output unit 508 while associating the device and the SNMP authentication information with each other. The SNMP authentication information determination logic unit implements a second setting unit.

If no SNMP authentication information is registered together with the device information, the SNMP authentication information determination logic unit 507 issues a target device SNMP authentication information request to the SNMP authentication information input/output unit 502. If the SNMP authentication information of the target device is acquired from the SNMP authentication information input/output unit 502 as the result of the request, the SNMP authentication information determination logic unit 507 associates the target device and the acquired SNMP authentication information with each other. The SNMP authentication information determination logic unit 507 then issues a registration request to the plug-in SNMP authentication information input/output unit 508.

If no SNMP authentication information is acquired from the management software 500 as the result of the request, the SNMP authentication information determination logic unit 507 acquires, from a plug-in default authentication information storing unit 509, the default value of SNMP authentication information to be commonly used in the plug-in software 520. The SNMP authentication information determination logic unit 507 then issues a registration request to the plug-in SNMP authentication information input/output unit 508 while associating the device and the default value of SNMP authentication information with each other. Note that the default value stored in the plug-in default authentication information storing unit 509 is defined and set in advance. The plug-in default authentication information storing unit 509 is formed from, for example, the storage device 408. The plug-in default authentication information storing unit 509 thus implements an authentication information storage unit in the plug-in software 520.

Upon receiving the registration request of the device associated with the SNMP authentication information, the plug-in SNMP authentication information input/output unit 508 registers the device and the SNMP authentication information in a plug-in SNMP authentication information storing unit 510.

The plug-in manager 511 acquires device management information from the device 100 via the network based on a unique schedule or a user instruction. The plug-in manager 511 extracts the target device and its SNMP authentication information from the plug-in SNMP authentication information storing unit 510 and issues a device management information acquisition request to the SNMP client 512. Note that the plug-in SNMP authentication information storing unit 510 is formed from, for example, the storage device 408.

In addition, the plug-in UI device registration unit 506 can issue an SNMP authentication information update instruction for an already registered device. In this embodiment, there are two methods of updating SNMP authentication information. In one update method, the plug-in software 520 overwrites new SNMP authentication information. In the other update method, SNMP authentication information associated with an existing device is deleted, and SNMP authentication information is acquired from the management software 500.

The update method of causing the plug-in software to overwrite new SNMP authentication information is the same as the processing at the time of device registration, and a description thereof will be omitted. In the update method of causing the plug-in software 520 to acquire SNMP authentication information from the management software 500, the plug-in UI device registration unit 506 receives a request to update the SNMP authentication information of an already registered device. Upon receiving the update request, the plug-in UI device registration unit 506 notifies the SNMP authentication information determination logic unit 507 of the target, device information and that the update request requires to acquire SNMP authentication information from, the management software 500. The SNMP authentication information determination logic unit 507 issues the target device SNMP authentication information acquisition request to the SNMP authentication information input/output unit 502.

If the SNMP authentication information of the target device is acquired from the SNMP authentication information input/output unit 502 as the result of the request, the SNMP authentication information determination logic unit 507 associates the target device and the acquired SNMP authentication information with each other. The SNMP authentication information determination logic unit 507 then issues a registration request to the plug-in SNMP authentication information input/output unit 508. If no SNMP authentication information is acquired from the management software 500 as the result of the request, the SNMP authentication information determination logic unit 507 ends the update processing without changing the currently registered SNMP authentication information.

Note that the management software device information storing unit 504 of the management software 500 is defined as a first storing unit, and the plug-in SNMP authentication information storing unit 510 of the plug-in software 520 is defined as a second storing unit. These storing units are separated for the explanation of the software configuration but may be the same hardware from the viewpoint of physical arrangement.

Arrangement of Nonvolatile Area of Management Software

FIG. 6 is a table showing some of the pieces of information recorded in the management software common authentication information storing unit 503 and the management software device information storing unit 504 shown in FIG. 5. To acquire management information from a device using SNMP, the management software 500 confirms the information stored in the nonvolatile area and acquires authentication information to access the device. The nonvolatile area is formed in, for example, the storage device 408 shown in FIG. 4.

A Device ID 601 is an identifier to uniquely identify the device 100. For example, the serial number or the MAC address of each device is used. Using this identifier allows the management apparatus 101 to uniquely identify the device.

A Community Name 602 is SNMP authentication information to be used by the management software to acquire management information from a device via the network.

A Type 603 represents the relationship between the Device ID 601 and the Community Name 602. For example, "common community name" is recorded in the Type item of "Device A" in the table. This indicates that when registering the Device A, the default value (public-parent) of SNMP authentication information commonly used in the management software 500 has been applied without designating individual SNMP authentication information.

In addition, "specific community name" is recorded in the Type item of "Device B" in the table. This indicates that when registering the Device B, specific SNMP authentication information (dev-group1) has been designated.

The Community Name item of "Device D" has no entry, and "no community name" is recorded in the Type item. Such an entry is created by registering a device when the default value of SNMP authentication information to be commonly used in the management software is not set. "When the default value is not set" indicates the time from installation of the management software 500 in the management apparatus 101 to setting of the default SNMP authentication information.

Finally, "common community name" is recorded in the Type item of "Device Default" in the table. This indicates the information stored in the management software common authentication information storing unit 503 shown in FIG. 5, which is the default value (public-parent) of SNMP authentication information commonly used in the management software 500. In this table, the meanings of the pieces of information of Type are represented by character strings. Actually, the pieces of information are distinguished using a flag or the like, and the settings are stored in the DB in general.

Arrangement of Nonvolatile Area of Plug-In Software

FIG. 7 is a table showing some of the pieces of information recorded in the plug-in default authentication information storing unit 509 and the plug-in SNMP authentication information storing unit 510 shown in FIG. 5. To acquire management information from the device 100 using SNMP, the plug-in software 520 confirms the information stored in the nonvolatile area and acquires authentication information to access the device. The nonvolatile area is formed in, for example, the storage device 408 of the management apparatus 101 shown in FIG. 4.

A description of a Device ID 701 and a Community Name 702 is the same as that of the Device ID 601 and the Community Name 602 shown in FIG. 6 and will be omitted.

A Type 703 represents the relationship between the Device ID 701 and the Community Name 702. For example, "community name of management software" is recorded in the Type item of "Device A" in the table. This indicates that when registering the device in the plug-in software 520, the information (public-parent) managed in the management software device information storing unit 504 has been acquired without designating SNMP authentication information via the plug-in UI device registration unit 506. The table has no entry of "Device B" because the Device B is not the management target of the plug-in software 520. This indicates that each of the management software 500 and the plug-in software 520 can select management target devices.

"Community name specific to plug-in" is described in the Type item of "Device C" in the table. This indicates that when registering the device in the plug-in software 520, the default value (maintenance-group1) of SNMP authentication information managed in the plug-in software 520 has been applied because no SNMP authentication information is designated, and no authentication information is managed in the management software 500.

Finally, "community name common to plug-in" is recorded in the Type item of "Default Device" in the table. This indicates the information stored in the plug-in default authentication information storing unit 509 shown in FIG. 5, which is the default value (public-plugin) of SNMP authentication information commonly used in the plug-in software 520. In this table as well, the meanings of the pieces of information of the Type item are represented by character strings, as in FIG. 6. Actually, the pieces of information are distinguished using a flag or the like, and the settings are stored in the DB.

Arrangement of Nonvolatile Area of Plug-In Software

FIG. 8 is a table showing some of the pieces of information recorded in the plug-in default authentication information storing unit 509 and the plug-in SNMP authentication information storing unit 510 shown in FIG. 5. If no SNMP authentication information is designated at the time of device registration, the plug-in software 520 refers to the SNMP authentication information in the management software 500 and stores the target device and the SNMP authentication information in association with each other. However, when the SNMP authentication information is updated in the management software 500, automatic update is not performed in the plug-in software 520 because the user who uses it is different. Hence, when the SNMP authentication information is updated in the device 100 and the management software 500, the plug-in software 520 cannot perform communication. To avoid this problem, when the user B issues a community name acquisition update instruction, the plug-in software 520 reacquires the community name of the designated device from the management software 500.

For example, when the user B instructs to acquire and update the community name of the "Device C" in the table from the state shown in FIG. 7, the plug-in software acquires the Community Name of the "Device C" managed in the management software 500 in FIG. 5. When acquisition of the information of the Community Name item of the "Device C" has succeeded, the plug-in software 520 updates the Community Name item from "maintenance-group1" in FIG. 7 to "dev-group1" in FIG. 8, as indicated by the "Device C" in FIG. 7. When the information of the Community Name item cannot be acquired from the management software 500, the plug-in software 520 continuously uses the information of the Community Name item under management because the management software 500 does not store the updated information.

Example of Operation of Management Software

An example of the operation of one management software 500 according to this embodiment will be explained based on the above-described arrangement.

Figure 9:
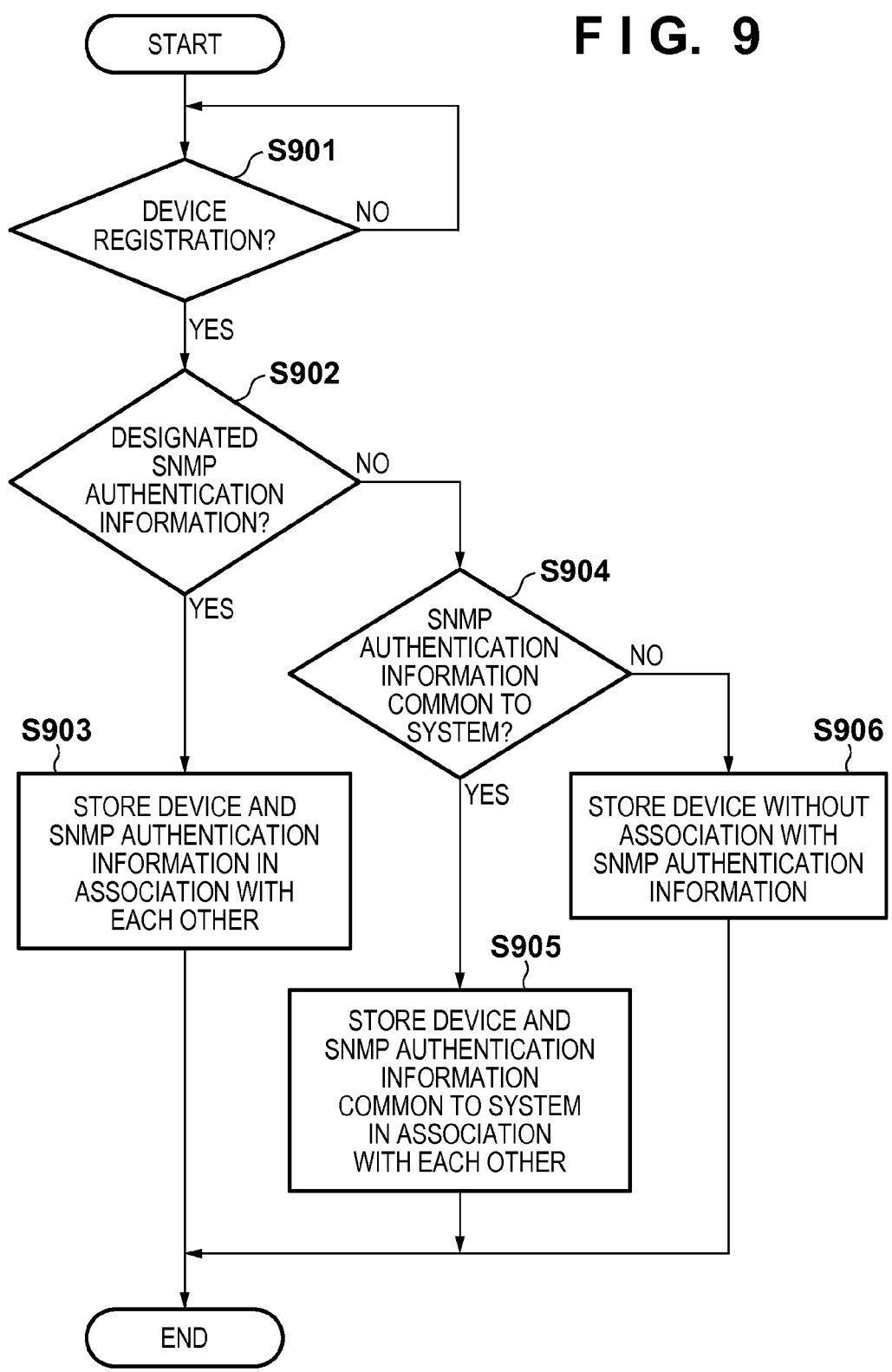
FIG. 9 is a flowchart showing an example of the operation at the time of device registration in the management software.

FIG. 9 is a flowchart showing processing up to associating a device and a community name when registering the device 100 in the management software 500. The processing of the flowchart is implemented by expanding a program stored in one storage unit of the ROM 403 and the storage device 408 shown in FUG. 4 on the RAM 404 as needed and causing the CPU 402 to execute it. The processing of the flowchart illustrated here represents the processing of the management software 500 shown in FIG. 5.

Referring to FIG. 9, when the user requests the device registration screen of the management software 500, the processing of the flowchart starts. In step S901, the management software 500 determines whether a device registration request is received. If a device registration request is received (YES in step S901), the process advances from step S901 to step S902.

In step S902, the management software 500 confirms the detailed information of the device registration request. If SNMP authentication information is designated in the detailed information of the device registration request (YES in step S902), the process advances from step S902 to step S903. If no SNMP authentication information is designated in the detailed information of the device registration request (NO in step S902), the process advances from step S902 to step S904.

In step S903, the management software 500 associates the registration target device with the designated SNMP authentication information, stores the device and the SNMP authentication information in the management software device information storing unit 504 shown in FIG. 5, and ends the processing.

In step S904, the management software 500 confirms whether the default value of SNMP authentication information to be commonly used in the management software is set. If the default value of SNMP authentication information to be commonly used in the management software is set (YES in step S904), the process advances from step S904 to step S905. If the default value of SNMP authentication information to be commonly used in the management software is not set (NO in step S904), the process advances from step S904 to step S906.

In step S905, the management software 500 associates the registration target device with the default value of SNMP authentication information to be commonly used in the management software, stores the device and the SNMP authentication information in the management software device information storing unit 504 shown in FIG. 5, and ends the processing.

In step S906, the management software 500 stores only the device information in the management software device information storing unit 504 shown in FIG. 5 without SNMP authentication information to be associated with the registration target device, and ends the processing.

Example of Operation in Device Registration of Plug-In Software

An example of the operation in device registration of the plug-in software 520 according to this embodiment will be explained based on the above-described, arrangement.

Figure 10:
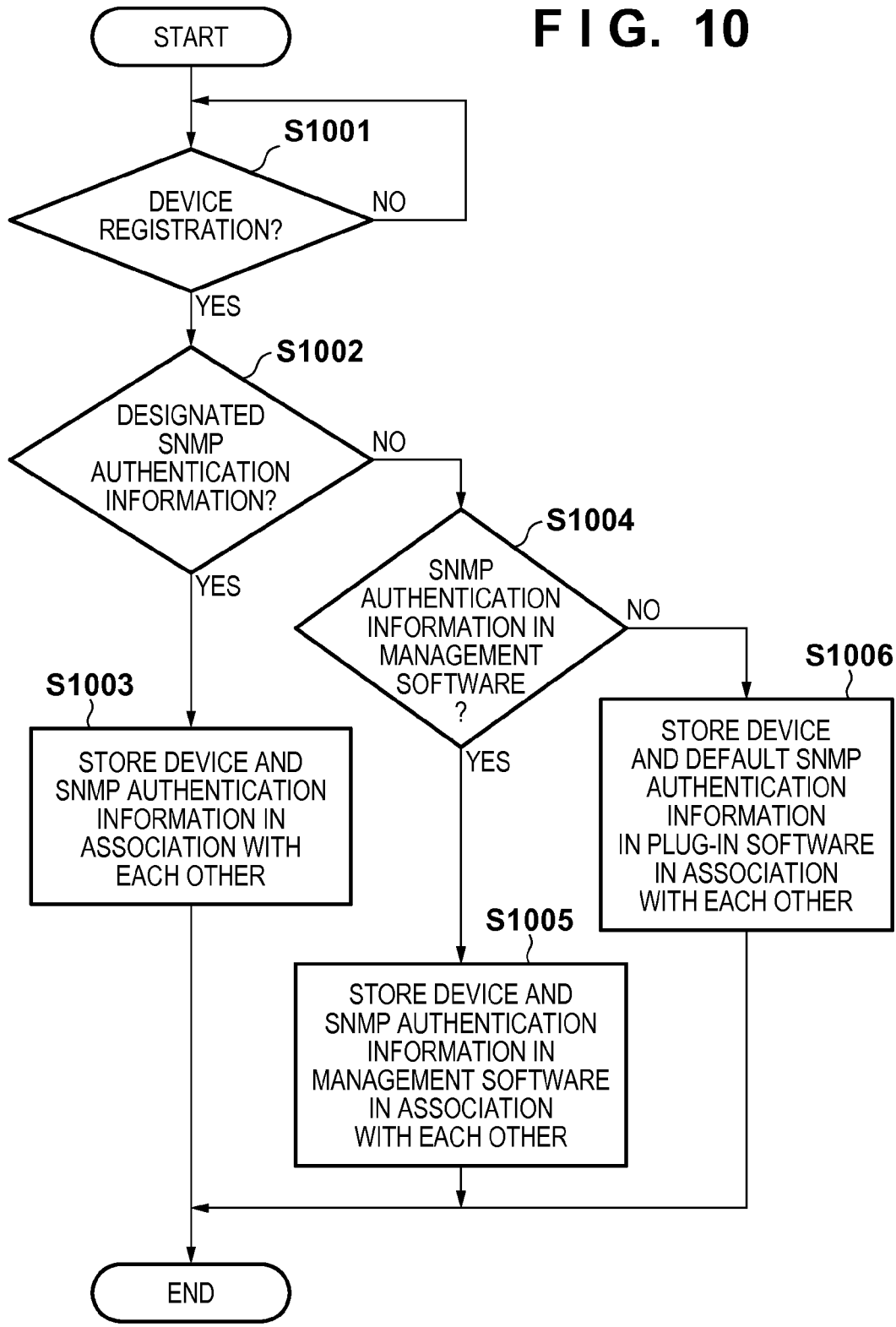
FIG. 10 is a flowchart showing an example of the operation at the time of device registration in the plug-in software.

FIG. 10 is a flowchart showing processing up to associating a device and a community name when registering the device 100 in the plug-in software 520. The processing of the flowchart is implemented by expanding a program stored in one storage unit of the ROM 403 and the storage device 408 shown in FIG. 4 on the RAM 404 as needed and causing the CPU 402 to execute it. The processing of the flowchart illustrated here represents the processing of the plug-in software 520 shown in FIG. 5.

Referring to FIG. 10, when the user requests the device registration screen of the plug-in software 520, the processing of the flowchart starts. In step S1001, the plug-in software 520 determines whether a device registration request is received. If a device registration request is received (YES in step S1001), the process advances from step S1001 to step S1002.

In step S1002, the plug-in software 520 confirms the detailed information of the device registration request. If SNMP authentication information is designated in the detailed information of the device registration request (YES in step S1002), the process advances from step S1002 to step S1003. If no SNMP authentication information is designated in the detailed information of the device registration request (NO in step S1002), the process advances from step S1002 to step S1004.

In step S1003, the plug-in software 520 associates the registration target device with the designated SNMP authentication information, stores the device and the SNMP authentication information in the plug-in SNMP authentication information storing unit 510 shown in FIG. 5, and ends the processing.

In step S1004, the plug-in software 520 confirms whether the SNMP authentication information of the registration target device is registered in the management software 500. If the SNMP authentication information of the registration target device is already registered in the management software (YES in step S1004), the process advances from step S1004 to step S1005. If the SNMP authentication information of the registration target device is not registered in the management software (NO in step S1004), the process advances from, step S1004 to step S1006. Note that if the SNMP authentication information is registered in the management software 500 but cannot be acquired in step S1004, the determination may end with "NO".

In step S1005, the plug-in software 520 associates the registration target device with the SNMP authentication information of the registration target device registered in the management software 500. The plug-in software 520 then stores the device and the SNMP authentication information in the plug-in SNMP authentication information storing unit 510 shown in FIG. 5, and ends the processing.

In step S1006, the plug-in software 520 associates the registration target device with the default value of SNMP authentication information to be commonly used in the plug-in software 520. The plug-in software 520 then stores the device and the SNMP authentication information in the plug-in SNMP authentication information storing unit 510 shown in FIG. 5, and ends the processing.

As described above, when the SNMP authentication information registration priority order in the plug-in software is set in accordance with information stored in the management software, authentication information management can appropriately be done in the following cases. That is, in this embodiment, SNMP authentication information is set in the plug-in software based on the priority order of (1) a community name designated via the plug-in setting screen or the like (the community name of a device designated by the user or the like), (2) the community name stored in the management software, and (3) the default (common) community name of the plug-in software.

SNMP authentication information is set in the management software based on the priority order of (1) she community name of the management software (the community name of a device designated by the user or the like), (2) the community name (common) of the management software, and (3) no setting.

For example, assume an enterprise under strict security control. Management software and plug-in software are used by different users and independently manage a device. In this case, each software can manage one device by defining separate pieces of SNMP authentication information. This allows the independence of the management software and the plug-in software to be maintained, ensuring ensure high security control.

On the other hand, there is an enterprise which has determined that tight security control of devices is unnecessary. In this case, one piece of SNMP authentication information (for example, "public") is set for the devices. The default value of SNMP authentication information is set in the management software. This setting enables to commonly use the default SNMP authentication information without individually inputting SNMP authentication information to the management software and the plug-in software.

Each software can determine for each device whether to use the default value of SNMP authentication information or use an individual set value. It is therefore possible to selectively use the SNMP authentication information in accordance with the time and circumstances.

Example of Operation in SNMP Authentication Information Update of Plug-In Software An example of the operation in SNMP authentication information update of the plug-in software 520 according to this embodiment will be explained based on the above-described arrangement.

Figure 11:
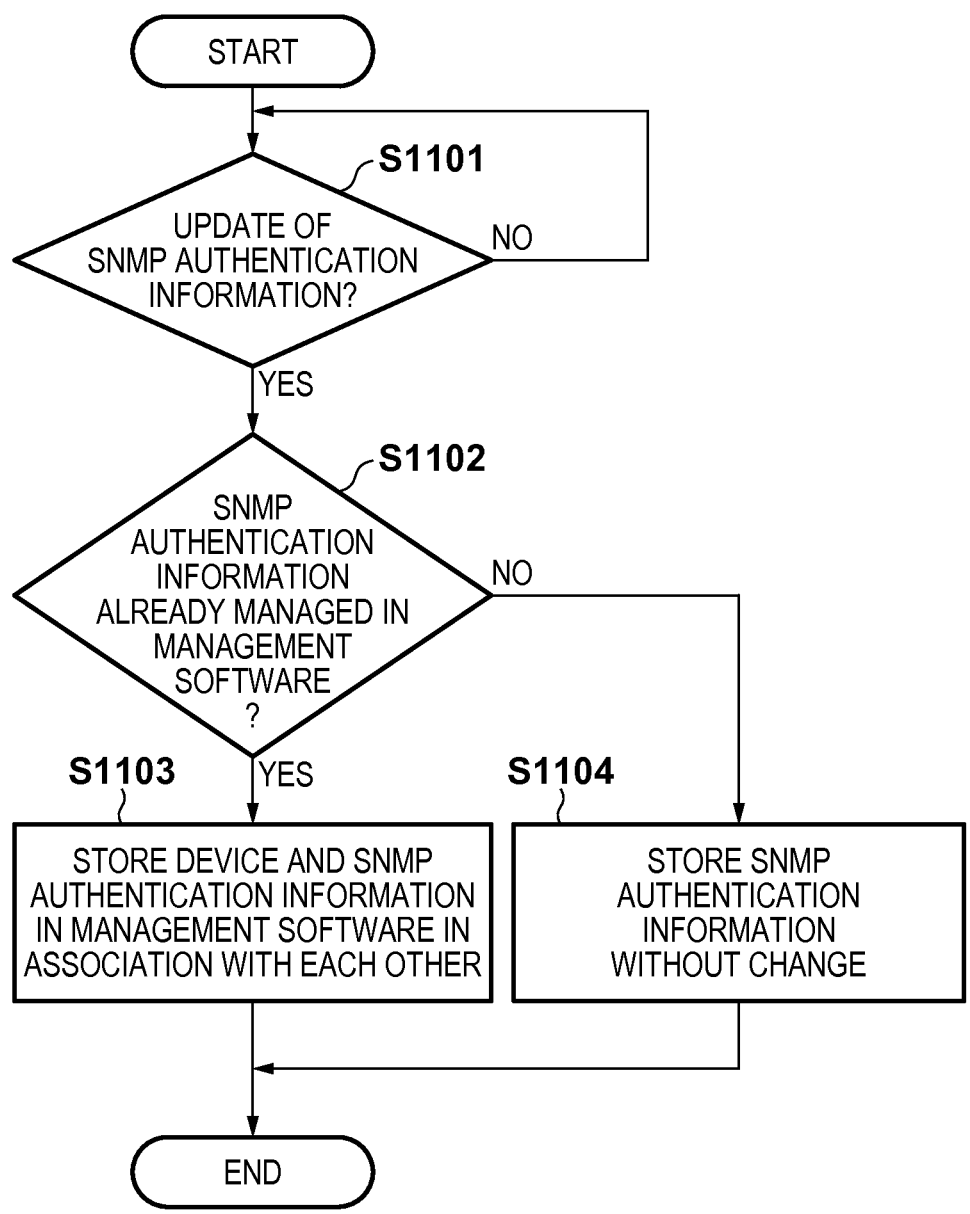
FIG. 11 is a flowchart showing an example of the operation at the time of device information update in the plug-in software.

FIG. 11 is a flowchart showing processing up to associating a device and a community name when updating the SNMP authentication information of the device 100 registered in the plug-in software 520. The processing of the flowchart is implemented by expanding a program stored in the storage unit or one of the ROM 403 and the storage device 408 shown in FIG. 4 on the RAM 404 as needed and causing the CPU 402 to execute it. The processing of the flowchart illustrated here represents the processing of the plug-in software 520 shown in FIG. 5.

Referring to FIG. 11, when the user requests the SNMP authentication information update screen for the device registered in the plug-in software 520, the processing of the flowchart starts. In step S1101, the plug-in software 520 determines whether a request to update the SNMP authentication information of the device under management is received from the user via, for example, the operation unit UI 306. If the SNMP authentication information update request is received (YES in step S1101), the process advances from step S1101 to step S1102.

In step S1102, the plug-in software 520 confirms whether the SNMP authentication information of the update target device is registered in the management software 500. If the SNMP authentication information of the update target device is registered in the management software 500 (YES in step S1102), the process advances from step S1102 to step S1103. If the SNMP authentication information of the update target device is not registered in the management software 500 (NO in step S1102), the process advances from step S1102 to step S1104.

In step S1103, the plug-in software 520 associates the update target device with the SNMP authentication information of the update target device registered in the management software 500. The plug-in software 520 then stores the device information and the SNMP authentication information in the plug-in SNMP authentication information storing unit 510 shown in FIG. 5, and ends the processing.

In step S1104, the plug-in software 520 directly ends the processing without changing the SNMP authentication information.

Example of User Interface in Device Registration of Plug-In Software

FIGS. 12A to 12C show a device registration method on the registration screen for the device 100 in the plug-in software 520. An example of a display method when the plug-in software 520 sets a device registered in the management software 500 as its management target will be explained with reference to FIGS. 12A to 12C.

FIG. 12A shows an example of the device registration screen in the plug-in software 520. This screen is provided for the user by the plug-in UI device registration unit 506 shown in FIG. 5. The user can directly input device information to the screen to register a device. To refer to devices registered in the management software 500, the user presses an "Add from Device List" button 1201 at the upper portion of FIG. 12A. The display then transits to the screen shown in FIG. 12B.

FIG. 12B shows an example of a screen that displays a list of devices in the management software 500. The user of the plug-in software 520 selects and determines management target devices from the device list using the check boxes. When the user presses an "Add" button 1202 at the lower portion of the screen, the display transits to the screen shown in FIG. 12C. A description will be made assuming that two devices on the upper side of the device list are selected.

FIG. 12C shows an example of the original device registration screen of the plug-in software 520. The arrangement of the screen is the same as in FIG. 12A except that the devices selected in FIG. 12B are displayed as already registered devices. As for a set value 1203 of the Community Name serving as the SNMP authentication information of the device, the information in the management software is referred to, although the detailed value is not displayed for the user. This aims at preventing the user from recognizing the detailed value even if the same set value is used. When changing the SNMP authentication information, the user can edit the authentication information on this screen. After the device information is completed, the user presses an "Add" button 1204 at the lower portion of the screen, thereby completing device registration in the plug-in software 520.

The user of the plug-in software can use the SNMP authentication information of the device registered in the management software in the above-described way. If the user wants to designate the SNMP authentication information by himself/herself, he/she can preferentially edit the SNMP authentication information.

Example of User Interface in SNMP Authentication Information Display of Plug-In Software FIGS. 13A and 13B show a method of displaying the SNMP authentication information of the device 100 in the plug-in software 520. It is considered to make the method of causing the plug-in software 520 to display the SNMP authentication information of a device acquired from the management software 500 different from the method of displaying the SNMP authentication information of a device directly input from the management screen of the plug-in software 520.

FIG. 13A shows an example of the display screen of detailed information of a device managed in the plug-in software 520. The SNMP authentication information of this device is set by referring to the management software 500. A character string "(set)" is displayed as SNMP authentication information 1301 (SNMP Community Name in FIG. 13A) of this device, and the actual authentication information is not displayed.

FIG. 13B similarly shows an example of the display screen of detailed information of a device managed in the plug-in software 520. The SNMP authentication information of this device is set via the UI of the plug-in software 520. An actually input character string ("maintenance-group1" in this example) is displayed as SNMP authentication information 1302 (SNMP Community Name in FIG. 13B) of this device.

This makes it possible to acquire information from the device, like the management software 500, as long as the SNMP authentication information is set in the management software 500 even if the user of the plug-in software 520 does not know the SNMP authentication information.

In addition, information acquisition from the device can be done without notifying the user of the plug-in software 520 of security information, that is, SNMP authentication information. Assume that the users are different, for example, the user of the management software 500 is the system administrator, and the user of the plug-in software 520 is the serviceman undertaking maintenance. In this case, the system administrator can share the access right without sharing the authentication information.

Automatic Update Processing of Device Community Name

An example of the operation in communication between the plug-in software 520 and the device 100 according to this embodiment will be explained based on the above-described arrangement.

FIG. 14 is a flowchart showing processing of automatically updating the community name of the device 100 that is the communication target when the plug-in software 520 and the device 100 communicate. The processing of the flowchart is implemented by expanding a program stored in the storage unit of one of the ROM 403 and the storage device 408 shown in FIG. 4 on the RAM 404 as needed and causing the CPU 402 to execute it. The processing of the flowchart illustrated here represents the processing of the plug-in software 520 shown in FIG. 5.

The plug-in manager 511 of the plug-in software 520 performs communication to acquire device management information from the device 100 via the network 102 based on a predefined unique schedule or a user instruction. The processing procedure of this communication is shown in FIG. 14. Note that the SNMP authentication information in the plug-in software 520 itself will be referred to as "SNMP authentication information X", and the SNMP authentication information of the device registered in the management software 500 will be referred to as "SNMP authentication information Y" in the following explanation.

When communication processing between the plug-in software 520 and the device 100 starts, the processing of the flowchart shown in FIG. 14 starts. In step S1401, triggered by, for example, scheduled transmission or a user instruction, the plug-in software 520 communicates with the device 100 using the SNMP authentication information X of the plug-in software 520 itself.

If the communication processing has failed (YES in step S1402), the process advances to step S1403. If the communication processing has succeeded (NO in step S1402), the plug-in software 520 ends the procedure without changing the SNMP authentication information. When determining success or failure of the communication in step S1402, if an error has occurred due to a reason other than the SNMP authentication information, the plug-in software 520 determines that the communication has succeeded (NO in step S1402), and ends the procedure without changing the SNMP authentication information.

In step S1403, the plug-in software 520 acquires the SNMP authentication information Y of the communication target device from the management software 500. In step S1404, the plug-in software 520 determines whether the SNMP authentication information Y is registered in the management software 500, and the SNMP authentication information Y is different from the SNMP authentication information X used for the communication in step S1401. If the SNMP authentication information Y is registered in the management software 500 and is different from the SNMP authentication information X (YES in step S1404), the process advances to step S1405. Otherwise (NO in step S1404), the plug-in software 520 ends the procedure without changing the value of the SNMP authentication information X. Note that if the SNMP authentication information Y of the communication target device is not registered in the management software 500, the SNMP authentication information Y cannot be acquired in step S1403.

In step S1405, the plug-in software 520 communicates with the device 100 as the communication target using the SNMP authentication information Y acquired in step S1403. As the communication contents, for example, data of the communication executed in step S1401 is resent. If the communication processing has succeeded (YES in step S1406), the process advances to step S1407. If the communication processing has failed (NO in step S1406), the procedure ends.

In step S1407, the plug-in software 520 stores the SNMP authentication information Y acquired from the management software 500 in the plug-in SNMP authentication information storing unit 510 shown in FIG. 5. Then, the procedure ends.

Note that in this embodiment, the attempt of communication (step S1405) using the SNMP authentication information Y in the management software 500 is performed once after the first communication failure. However, the attempt may be done a plurality of times.

In this embodiment, the attempt of communication (step S1405) using the SNMP authentication information Y in the management software 500 is performed at the time of resend processing after the first communication. However, the attempt may be done at another timing. In this case, the plug-in software 520 stores the communication result and refers to it by, for example, periodical processing at a predetermined interval, thereby determining whether to attempt communication using the SNMP authentication information Y in the management software 500. The contents of communication attempted here may be the same as those of the communication that has previously failed. Alternatively, data communication using a small quantity of data for communication test may be performed.

In this embodiment, when updating the SNMP authentication information in the plug-in software 520, the SNMP authentication information is automatically updated, triggered by a communication failure, only when the SNMP authentication information in the management software 500 is valid authentication information for success of communication. For this reason, the user's SNMP authentication information update instruction is unnecessary, and it is possible to prevent an invalid value from being stored in case of an SNMP authentication information setting error in the management software 500.

The above embodiment has been described using SNMP authentication information as authentication information for device management. However, the protocol is not limited to SNMP, and any other authentication information is usable.

Basic authentication using HTTP (HyperText Transfer Protocol) or authentication information of another protocol may be adopted.

When the SNMP authentication information is not individually set in the management software, SNMP authentication information common to the management software is set. However, the management software need not always have the unit for setting the common SNMP authentication information.

In the embodiment, SNMP version 1 is used. However, the version is not limited to this, and any other version of SNMP is applicable. For example, the user name and password of SNMP version 3 may be used as the SNMP authentication information.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-129545, filed Jun. 9, 2011, and No. 2011-272755, filed Dec. 13, 2011, which are hereby incorporated by reference herein in their entirety.

What is claimed is:

1. A management apparatus that causes a control unit to execute first management software for managing a plurality of devices on a network, comprising:
   a processor; and
   a memory coupled to the processor, the memory storing instructions that, when executed by the processor, cause the management apparatus to:
      store, in a first storing unit, authentication information to be used to access a device using a function of the first management software;
      store, in a second storing unit, authentication information to be used to access the device using a function of second management software that is added to the first management software to add a new function;
      register the device to be managed by the second management software; and
      set the authentication information to be used to access the device using the function of the second management software,
   wherein when the authentication information is set, the set authentication information is stored as the information to be used to access the registered device, and
   wherein when the authentication information is not set, and the authentication information to be used to access the registered device is stored, the authentication information is stored as the information to be used to access the registered device.

2. The apparatus according to claim 1, wherein when authentication information is not set, and the first storing unit does not store the authentication information to be used to access the registered device, the second storing unit stores authentication information managed as a default by the second management software as the information to be used to access the registered device.

3. The apparatus according to claim 1, wherein the memory further includes instructions that, when executed by the processor, cause the management apparatus to set the authentication information to be used to access the device using the function of the first management software,
   wherein when the authentication information is set, the first storing unit stores the set authentication information as the information to be used to access the device, and
   wherein when the authentication information is not set, the first storing unit stores authentication information managed to be commonly used for the plurality of devices as the information to be used to access the device.

4. The apparatus according to claim 1, further comprising a display unit operatively coupled to the memory and configured to display detailed information of the registered device as the function of the second management software,
   wherein when displaying the information to be used to access the device as the detailed information of the device, if the second storing unit stores the authentication information stored in the first storing unit, the display unit displays not the authentication information but a notification representing that the authentication information is set.

5. The apparatus according to claim 1, wherein
   upon receiving a request to update the authentication information to be used to access the device using the function of the second management software,
   if the first storing unit does not store the authentication information designated by the update request, the authentication information stored in the second storing unit is not updated in accordance with the update request, and
   if the first storing unit already stores the authentication information designated by the update request, the second storing unit stores the authentication information designated by the update request as the information to be used to access the device in accordance with the update request.

6. The apparatus according to claim 1, wherein when the second management software has failed in accessing the device using the authentication information stored in the second storing unit, the second storing unit acquires the authentication information enabling access to the device, which is stored in the first storing unit, and updates the stored authentication information to the acquired authentication information.

7. The apparatus according to claim 1, wherein the authentication information to be used to access the device is authentication information of SNMP (Simple Network Management Protocol).

8. The apparatus according to claim 7, wherein the authentication information of SNMP includes a community name of SNMP version 1 or a user name and password of SNMP version 3.

9. A management method of a management apparatus that causes a control unit to execute first management software for managing a plurality of devices on a network, the management apparatus including a first storing unit configured to store authentication information to be used to access a device using a function of the first management software, and a second storing unit configured to store authentication information to be used to access the device using a function of second management software that is added to the first management software to add a new function, comprising:
   registering the device to be managed by the second management software; and
   setting, in a second setting step, the authentication information to be used to access the device using the function of the second management software,
   wherein when the authentication information is set in the second setting step, the second storing unit stores the set authentication information as the information to be used to access the registered device, and
   wherein when the authentication information is not set in the second setting step, and the first storing unit stores the authentication information to be used to access the registered device, the second storing unit stores the authentication information stored in the first storing unit as the information to be used to access the registered device.

10. The method according to claim 9, wherein when the authentication information is not set in the second setting step, and the first storing unit does not store the authentication information to be used to access the registered device, the second storing unit stores authentication information managed as a default by the second management software as the information to be used to access the registered device.

11. The method according to claim 9, further comprising setting, in a first setting step, the authentication information to be used to access the device using the function of the first management software,
   wherein when the authentication information is set in the first setting step, the first storing unit stores the set authentication information as the information to be used to access the device, and
   wherein when the authentication information is not set in the first setting step, the first storing unit stores authentication information managed to be commonly used for the plurality of devices as the information to be used to access the device.

12. The method according to claim 9, wherein when the second management software has failed in accessing the device using the authentication information stored in the second storing unit, the authentication information stored in the second storing unit is updated to the authentication information enabling access to the device, which is stored in the first storing unit.

13. The method according to claim 9, wherein the authentication information to be used to access the device is authentication information of SNMP (Simple Network Management Protocol).

14. The method according to claim 13, wherein the authentication information of SNMP includes a community name of SNMP version 1 or a user name and password of SNMP version 3.

15. A computer-readable medium storing a program to be executed by a computer to add a new function to management software for managing a plurality of devices on a network, the computer including a first storing unit configured to store authentication information to be used to access a device using a function of the management software, and a second storing unit configured to store authentication information to be used to access the device using the function of the program added to the management software, wherein the program causes the computer to execute a method comprising:
   registering the device to be managed by the program; and
   setting the authentication information to be used to access the device using the function of the program,
   wherein when the authentication information is set in the setting step, the second storing unit stores the set authentication information as the information to be used to access the registered device, and
   wherein when the authentication information is not set in the setting step, and the first storing unit stores the authentication information to be used to access the registered device, the second storing unit stores the authentication information stored in the first storing unit as the information to be used to access the registered device.

16. The computer-readable medium according to claim 15, wherein when the authentication information is not set in the setting step, and the first storing unit does not store the authentication information to be used to access the registered device, the second storing unit stores authentication information managed as a default by the function of the program as the information to be used to access the registered device.

17. The computer-readable medium according to claim 15, wherein when the function of the program has failed in accessing the device using the authentication information stored in the second storing unit, the second storing unit acquires the authentication information enabling access to the device, which is stored in the first storing unit, and updates the stored authentication information to the acquired authentication information.

18. The computer-readable medium according to claim 15, wherein the authentication information to be used to access the device is authentication information of SNMP (Simple Network Management Protocol).

19. The computer-readable medium according to claim 18, wherein the authentication information of SNMP includes a community name of SNMP version 1 or a user name and password of SNMP version 3.

* * * * *